US012569936B2

(12) United States Patent
Sepp et al.

(10) Patent No.: US 12,569,936 B2
(45) Date of Patent: Mar. 10, 2026

(54) PROCESSES AND DEVICES FOR BEAM PROCESSING OF PLATE-SHAPED OR TUBULAR WORKPIECES

(71) Applicant: WSoptics technologies GmbH, Rettenbach am Auerberg (DE)

(72) Inventors: Florian Sepp, Altenstadt (DE); Christoph Weiss, Peiting (DE)

(73) Assignee: WSoptics technologies GmbH, Rettenbach am Auerberg (DE)

( * ) Notice: Subject to any disclaimer, the term of this patent is extended or adjusted under 35 U.S.C. 154(b) by 929 days.

(21) Appl. No.: 17/409,954

(22) Filed: Aug. 24, 2021

(65) Prior Publication Data

US 2021/0379699 A1 Dec. 9, 2021

Related U.S. Application Data

(63) Continuation of application No. PCT/EP2020/054953, filed on Feb. 25, 2020.

(30) Foreign Application Priority Data

Feb. 25, 2019 (EP) ..................................... 19159234

(51) Int. Cl.
B23K 26/361 (2014.01)
B23K 26/38 (2014.01)
(Continued)

(52) U.S. Cl.
CPC ............ B23K 26/361 (2015.10); B23K 26/38 (2013.01); *B23K 2101/06* (2018.08); *B23K 2101/18* (2018.08)

(58) Field of Classification Search
CPC ........................ B23K 2101/06; B23K 2101/18; B23K 26/38; B23K 26/361
(Continued)

(56) References Cited

U.S. PATENT DOCUMENTS

| | | | | | |
|---|---|---|---|---|---|
| 3,453,097 A | * | 7/1969 | Hafner | ................... | B23K 26/18 |
| | | | | | 219/121.72 |
| 5,084,604 A | * | 1/1992 | Dekker | ................... | B23K 26/40 |
| | | | | | 219/121.72 |

(Continued)

FOREIGN PATENT DOCUMENTS

| | | |
|---|---|---|
| CN | 101147241 | 3/2008 |
| CN | 103229332 | 7/2013 |

(Continued)

OTHER PUBLICATIONS

European Search Report in European Appln. No. 22156460.2, mailed Jul. 5, 2022, 8 pages (with English translation).

(Continued)

*Primary Examiner* — Jimmy Chou
(74) *Attorney, Agent, or Firm* — Fish & Richardson P.C.

(57) ABSTRACT

Processes, devices, and systems for beam processing of plate-shaped or tubular workpieces are provided. The processes include: a) carrying out at least one cutting procedure for producing a cutting gap along a cutting line that extends at least partially along a contour of a workpiece part to be produced from the workpiece, and b) carrying out at least one finishing procedure for finishing the workpiece along at least one part of the cutting gap, during which the workpiece part is not completely cut out. The cutting procedure includes moving a beam head for guiding a processing beam above the workpiece along the cutting line from a first cutting position to a second cutting position. The finishing procedure includes moving the beam head over the workpiece, and the processing beam is guided along a finishing line from a first finishing position to a second finishing position.

17 Claims, 9 Drawing Sheets

9,10

9,11

14

(51) Int. Cl.
　　*B23K 101/06* 　　　(2006.01)
　　*B23K 101/18* 　　　(2006.01)
(58) Field of Classification Search
　　USPC .................................................. 219/121.72
　　See application file for complete search history.

(56) References Cited

U.S. PATENT DOCUMENTS

| | | | | | |
|---|---|---|---|---|---|
| 5,197,013 | A | * | 3/1993 | Dundorf | G05B 19/4069 |
| | | | | | 700/182 |
| 5,223,692 | A | * | 6/1993 | Lozier | B23K 26/04 |
| | | | | | 219/121.72 |
| 6,133,541 | A | * | 10/2000 | Neubauer | B23K 10/00 |
| | | | | | 219/121.6 |
| 6,804,086 | B2 | * | 10/2004 | Jones | B23K 26/073 |
| 8,635,887 | B2 | * | 1/2014 | Black | C03B 33/0222 |
| | | | | | 219/121.72 |
| 8,658,938 | B2 | * | 2/2014 | Garry | B23K 26/389 |
| | | | | | 219/121.72 |
| 8,932,510 | B2 | * | 1/2015 | Li | C03B 33/091 |
| | | | | | 264/400 |
| 10,576,651 | B2 | * | 3/2020 | Tamon | B28D 1/226 |
| 2005/0172764 | A1 | * | 8/2005 | Fagan | B23K 37/0235 |
| | | | | | 83/13 |
| 2006/0027542 | A1 | * | 2/2006 | Mahadev | B23K 26/146 |
| 2008/0237207 | A1 | * | 10/2008 | Speker | B23K 26/1464 |
| | | | | | 219/121.84 |
| 2009/0046754 | A1 | * | 2/2009 | Kohda | H01S 5/34333 |
| | | | | | 438/33 |
| 2010/0147813 | A1 | * | 6/2010 | Lei | C03B 33/0222 |
| | | | | | 219/121.72 |
| 2010/0320179 | A1 | * | 12/2010 | Morita | B23K 26/40 |
| | | | | | 219/121.69 |
| 2011/0210109 | A1 | * | 9/2011 | Szelagowski | B23K 26/38 |
| | | | | | 219/121.72 |
| 2011/0240616 | A1 | * | 10/2011 | Osako | B23K 26/0626 |
| | | | | | 219/121.72 |
| 2013/0016935 | A1 | * | 1/2013 | Cooley | E21B 4/003 |
| | | | | | 384/129 |
| 2013/0316185 | A1 | * | 11/2013 | Evangelista | B23K 26/36 |
| | | | | | 219/121.69 |
| 2014/0008337 | A1 | * | 1/2014 | Yim | B23K 26/0093 |
| | | | | | 219/121.84 |
| 2015/0165548 | A1 | * | 6/2015 | Marjanovic | C03B 33/091 |
| | | | | | 219/121.73 |
| 2015/0251267 | A1 | * | 9/2015 | Winn | B23K 10/00 |
| | | | | | 83/76.1 |
| 2016/0059354 | A1 | * | 3/2016 | Sercel | B23K 26/0853 |
| | | | | | 219/121.68 |
| 2016/0059358 | A1 | * | 3/2016 | Ootsu | B23K 26/702 |
| | | | | | 219/121.72 |
| 2016/0199944 | A1 | * | 7/2016 | Hosseini | B23K 26/0622 |
| | | | | | 216/60 |
| 2017/0001266 | A1 | * | 1/2017 | Li | B23K 26/361 |
| 2018/0001421 | A1 | * | 1/2018 | Ottnad | B23K 37/0408 |
| 2018/0154475 | A1 | * | 6/2018 | Fagan | H01L 21/461 |
| 2019/0111516 | A1 | * | 4/2019 | Meyer | B23K 26/0861 |
| 2019/0299338 | A1 | * | 10/2019 | Weedlun | B23K 26/38 |
| 2019/0383998 | A1 | * | 12/2019 | Kangastupa | B23K 26/38 |
| 2020/0246920 | A1 | * | 8/2020 | Nakagawa | B23Q 17/10 |
| 2020/0406401 | A1 | * | 12/2020 | Breuer | H01M 4/75 |

FOREIGN PATENT DOCUMENTS

| | | | | |
|---|---|---|---|---|
| DE | 102014113878 | | | 3/2016 |
| JP | S60-049885 | | | 3/1985 |
| JP | H08108287 | | | 4/1996 |
| JP | H08108287 | A | * | 4/1996 |
| JP | 2002-210577 | | | 7/2002 |
| JP | 2011-253909 | | | 12/2011 |
| JP | 2011253909 | A | * | 12/2011 |
| JP | 2015-188908 | | | 11/2015 |
| JP | 2016-107317 | | | 6/2016 |
| TW | 201417928 | | | 5/2014 |
| WO | WO 2006118454 | | | 11/2006 |
| WO | WO 2011035777 | | | 3/2011 |
| WO | WO 2012072235 | | | 6/2012 |
| WO | WO 2014016138 | | | 1/2014 |
| WO | WO 2014048539 | | | 4/2014 |
| WO | WO 2016033494 | | | 3/2016 |
| WO | WO 2019077395 | | | 4/2019 |

OTHER PUBLICATIONS

International Preliminary Report on Patentability in International Appln. No. PCT/EP2020/054953, mailed on Sep. 2, 2021, 12 pages (with English translation).
International Search Report and Written Opinion in International Appln. No. PCT/EP2020/054953, mailed on Jul. 1, 2020, 16 pages (with English translation).
Office Action in Chinese Appln. No. 202080025618.7, mailed on Jul. 12, 2022, 7 pages (with English translation).
Office Action in Chinese Appln. No. 202080025618.7, mailed on Mar. 18, 2022, 11 pages (with English translation).
Office Action in Chinese Appln. No. 202210097351.3, mailed on Aug. 8, 2023, 12 pages (with English translation).
Office Action in European Appln. No. 22156460.2, dated Jul. 15, 2022, 10 pages (with English translation).
Office Action in Japanese Appln. No. 2021-572705, mailed on May 8, 2023, 9 pages (with English translation).
Office Action in Japanese Appln. No. 2021-572705, mailed on Nov. 16, 2022, 9 pages (with English translation).

* cited by examiner

Fig. 16
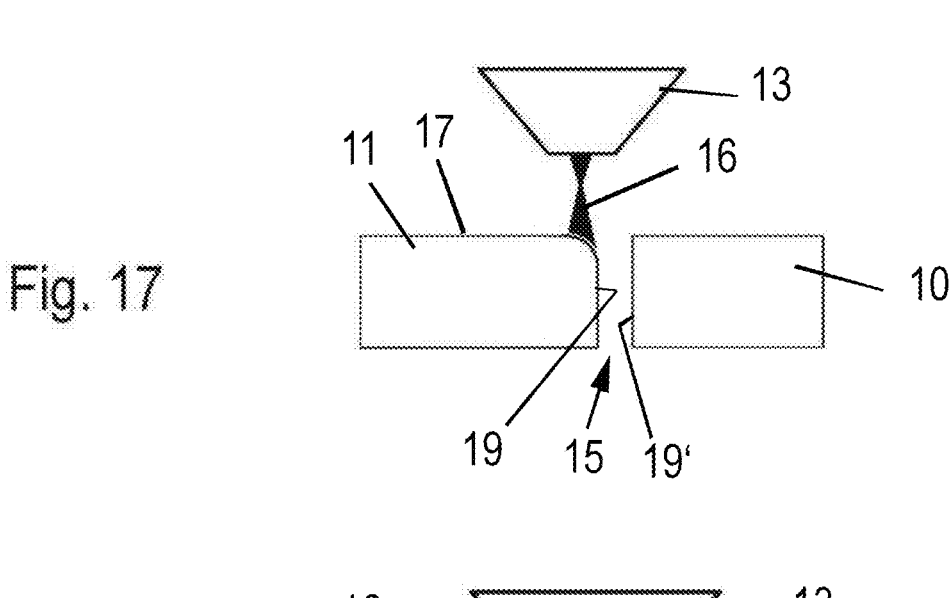
Fig. 17
Fig. 18
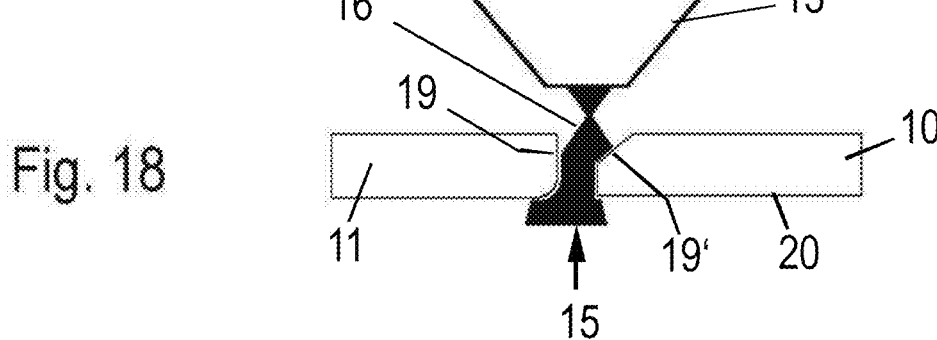

PROCESSES AND DEVICES FOR BEAM PROCESSING OF PLATE-SHAPED OR TUBULAR WORKPIECES

CROSS REFERENCE TO RELATED APPLICATIONS

This application is a continuation of and claims priority under 35 U.S.C. § 120 from PCT Application No. PCT/EP2020/054953, filed on Feb. 25, 2020, which claims priority from European Application No. 19159234.4, filed on Feb. 25, 2019. The entire contents of each of these priority applications are incorporated herein by reference.

TECHNICAL FIELD

The present disclosure is in the technical field of manufacturing metallic workpiece parts and relates to processes and devices for beam processing of plate-shaped or tubular workpieces.

BACKGROUND

Commercially available laser cutting devices with a movable beam head for guiding a laser beam enable automated production of workpiece parts in large quantities and with high precision. In this process, workpiece parts are cut out of a plate-shaped or tubular metallic workpiece along respective cutting lines by means of the laser beam.

Depending on the type of laser cutting process used, the cut edges of the cut workpiece parts usually require extensive mechanical finishing. Sharp cut edges have to be rounded, for example with a chamfer, and burrs on the cut edges have to be removed. Furthermore, the cut edges often have to be prepared for a later processing process, for example by smoothing or roughening. Another problem is the oxidation that occurs at the cut edges during laser cutting with oxygen as the working gas. Since oxide layers are usually difficult to paint, they have to be removed by grinding. Another problem is that the zinc coating on galvanized workpieces is lost in the area of the cutting gap, so that the workpieces made from galvanized workpieces either have to be re-galvanized, or galvanization is generally only carried out on the cut-out workpieces.

In principle, the machining, in particular mechanical machining, in the area of the cut edges after the complete cutting out of a workpiece part is very time-consuming and usually also very personnel-intensive, especially since it is often also carried out manually. In addition, the finishing is cost-intensive, so that the production of workpiece parts is undesirably prolonged and made more expensive.

WO 2014/016138 discloses a method for manufacturing synchronizer rings. Here, two synchronizer rings are cut out of a blank by a laser. Subsequently, the load surfaces of the cut synchronizer rings are laser-hardened by means of a defocused laser beam.

In the post-published WO 2019/077395, a process for the production of aluminum-coated steel parts is disclosed. In this process, a component is first cut out of a coated strip by means of a laser, followed by partial removal of the coating at the cut edge of the cut-out component by means of laser ablation.

DE 102014113878 A1 discloses a device suitable for laser cutting and annealing of components. In each case, finished cut-out components are subjected to laser annealing using a shielding for scattered radiation.

SUMMARY

An object of the present disclosure is to further develop processes for the production of workpiece parts, in which workpiece parts are cut out from a plate-shaped or tubular workpiece by a cutting beam, such that their production can be carried out in an automated manner more quickly and more economically.

One aspect of the present disclosure features process for the beam processing of a plate-shaped or tubular workpiece. The method according to the present disclosure can be used in any process in which the generation of a cutting gap in a workpiece is effected by a cutting beam (thermal cutting), for example, laser cutting or flame cutting. Preferably, but not necessarily, the process according to the present disclosure can be used in laser cutting of a workpiece, where the processing beam is a laser beam and the beam machining is laser beam machining.

Since in the process according to the present disclosure, in addition to a cutting machining of the workpiece to produce a cutting gap, a non-cutting and non-joining finishing of the workpiece in the region of the cutting gap also takes place, the term "processing beam" is used instead of cutting beam. It is understood that by adjusting the power density, the processing beam can optionally be used for cutting processing or for non-cutting as well as non-joining processing of the workpiece.

The beam processing of the process according to the present disclosure includes at least one cutting procedure for creating a cutting gap along a cutting line, and at least one finishing procedure for finishing the workpiece along at least a part of the cutting gap, the term "part" here referring to the extension of the cutting gap along the cutting line.

For the purposes of the present disclosure, a cutting line or a cutting gap is considered to extend exclusively along the contour of a workpiece part to be cut out of the workpiece, whereby the cutting line or the cutting gap need not necessarily extend along the complete contour. Rather, it is also possible for the cutting line or the cutting gap to extend only along part of the contour. A cutting gap is created along the cutting line, whereby the cutting gap extends along the entire cutting line. The creation of the cutting gap along the cutting line can be done in one or more steps. By creating the cutting gap, the workpiece part is partially or completely cut out along its contour, i.e., the cutting gap always forms a contour. Accordingly, the term "cutting line" or "cutting gap" in the sense of the present disclosure does not include sections of the cutting line or cutting gap that are not contour-forming and do not extend along the contour of a workpiece part. For example, when cutting out a workpiece part, the workpiece is often pierced at a distance from the contour and the cutting beam is first moved a short distance towards the contour of the workpiece part. The cutting gap created in this way does not form a contour and thus does not fall under the term "cutting gap" as it is to be understood in the sense of the present disclosure.

Although the process according to the present disclosure for the beam processing of a plate-shaped or tubular workpiece is explained for a single workpiece part, it is understood that, as a rule, a plurality of workpiece parts are cut out of the workpiece, the process according to the present disclosure being applied separately for each workpiece part.

The at least one cutting procedure of the process according to the present disclosure includes the cutting processing of the plate-shaped or tubular workpiece by a processing beam guided through a beam head, where a (contour-forming) cutting gap is produced along the cutting line. By irradiating the workpiece with the processing beam (in combination with a working gas directed at the cutting gap), a cutting gap is created that extends, for example, along the complete contour of the workpiece part, so that the workpiece part is completely cut out of the workpiece, is no longer connected to the remaining workpiece (residual grid) and can thus be removed directly from the residual grid. The workpiece part is cut free or detached from the workpiece by creating a closed cutting gap.

However, it is also possible that the cutting gap only extends along one or more parts (sections) of the contour of the workpiece part, so that the workpiece part is only partially cut out and the workpiece part continues to be connected to the residual grid. For example, the workpiece part is still connected to the residual grid by one or more webs (e.g., microjoints) after the workpiece part has been cut. These webs can be cut manually or automatically in the region of the cutting gap after the cutting gap has been produced and after the workpiece has been reworked in accordance with the present disclosure, so that the workpiece part can then be removed from the residual grid.

In accordance therewith, the term "cutting out" within the meaning of the present disclosure is intended to include both the complete cutting out and the partial cutting out of a workpiece part from the workpiece. If the workpiece part is to be completely cut out, the cutting line and thus also the cutting gap extends along the complete contour of the workpiece part. If the workpiece part is not to be cut out completely, i.e., only partially, the cutting line and thus the cutting gap only extend along one or more parts (sections) of the contour of the workpiece part. The cutting gap can be created along the complete cutting line, if necessary in several steps, so that the cutting gap extends along the complete cutting line after the at least one cutting procedure.

For the purposes of the present disclosure, the term "workpiece" means a plate-shaped or tubular, typically metallic, component from which at least one workpiece part, e.g., a plurality of workpiece parts, are to be produced. The plate-shaped workpiece is typically flat. For the tubular workpiece, which is bent, a tangential plane can be mentally constructed at any point on the surface. The at least one workpiece part is at least partially, e.g., completely, cut out of the workpiece. If at least one workpiece part has already been at least partially, e.g., completely, cut out of the workpiece, the remaining part of the workpiece (without a partially or completely cut-out workpiece part) is referred to as the residual grid. Accordingly, the workpiece may have one or more partially cut-out workpiece parts (i.e., still connected to the residual grid), and is thus composed of the residual grid and, if present, one or more partially cut-out workpiece parts.

In the process according to the present disclosure, the workpiece is only finished in the area of the cutting edge on the workpiece part side for those workpiece parts that have not been completely cut out, i.e., that are still connected to the remaining workpiece (i.e., residual grid). The residual grid always contains at least one waste part or is itself a waste part. A workpiece part that has been completely cut out and removed from the residual grid is not subjected to finishing as part of the process according to the present disclosure. A workpiece part still connected to the residual grid that is subjected to finishing is typically a good part. A workpiece part that is completely cut out from the residual grid and does not undergo any finishing as part of the process according to the present disclosure is typically a waste part. The completely cut-out waste part can, for example, produce a perforation in a good part. It is essential here that the at least one finishing procedure, e.g., all finishing procedures if several finishing procedures are carried out, is or are always carried out on a workpiece part that is not completely cut out and thus still connected to the residual grid. The energy density of the processing beam indicates the energy of the processing beam in relation to the area irradiated by the processing beam, for example measured in $J/mm^2$. Relevant for the creation of the cutting gap and the finishing of the workpiece along the cutting gap is the energy density in relation to the time interval in which the irradiated surface of the workpiece is irradiated, for example measured in $J/(mm^2 \times sec)$, hereinafter referred to as "power density." If the power density absorbed by the workpiece is essentially important, the power density can also be understood as the power density absorbed by the workpiece.

In the at least one cutting procedure, the cutting head is moved above the workpiece, where the processing beam, e.g., a cutting beam, is guided along a cutting line from a first cutting position to a second cutting position. The cutting line is a predetermined or predefined (imaginary) path along which the processing beam is guided. During the cutting processing of the workpiece, the processing beam has a first power density which is dimensioned in such a way that the workpiece is (completely) cut through. The processing beam interacts with a working gas beam directed at the cutting gap. In this process, a (contour-forming) cutting gap extending from the first cutting position to the second cutting position is created in the workpiece, which breaks through the workpiece. The process according to the present disclosure may include one or more cutting procedures for creating a cutting gap for a same workpiece part. As mentioned above, a non-contour forming cutting gap is not considered according to the present disclosure.

If the process according to the present disclosure includes only one cutting procedure for generating a cutting gap for a same workpiece part, the first cutting position and the second cutting position may be selected such that the (imaginary) cutting gap extends only along a part of the contour of the workpiece part. The partially cut out workpiece part then remains connected to the residual grid after the cutting processing of the workpiece to create the cutting gap. Alternatively, the first cutting position and the second cutting position can be selected in such a way that the (imaginary) cutting line and the cutting gap extend along the complete contour of the workpiece part, so that the workpiece part is completely cut out and can be removed from the residual grid immediately after being cut free by the processing beam.

If the process according to the present disclosure includes a plurality of cutting procedures for generating a cutting gap for a same workpiece part, a part of the cutting gap is generated along the cutting line in each cutting procedure, whereby the respective generated parts of the cutting gap complement each other to form the cutting gap. Typically, the cutting gap is continued continuously along the cutting line by a subsequent cutting procedure. The movement of the beam head is thus not continuous, but is interrupted at least once. To continuously continue the cutting gap along the cutting line, the first cutting position of a cutting procedure typically corresponds to the second cutting position of an immediately preceding cutting procedure. Each cutting procedure creates a portion of the cutting gap that extends from the first cutting position to the second cutting position of that cutting procedure.

The at least one finishing procedure is for finishing the workpiece along at least a portion of the cutting gap, where the term "portion" is used herein to refer to the extent of the cutting gap along the cut line. The workpiece may be finished along the entire cutting gap by the reworking procedure. Alternatively, the workpiece can be reworked by the reworking procedure along only a part (section) of the cutting gap (related to the extension of the cutting gap along the cutting line). The workpiece subjected to reworking may have one or more workpiece parts that have only been partially cut out. However, it is also conceivable that the workpiece does not have a partially cut-out workpiece part, but at least one workpiece part has been completely cut out and removed from the workpiece, so that the workpiece is a residual grid with remaining cut edges on the residual grid side. The residual grid can also only be machined in the area of a cutting edge on the residual grid side of a cutting gap. As mentioned above, workpiece parts that have been completely cut out and removed from the residual grid are not finished in the process according to the present disclosure.

The at least one finishing procedure includes moving the beam head over the workpiece, where the processing beam, which here is not a cutting beam but a finishing beam due to its power density, is guided along a finishing line from a first finishing position to a second finishing position. During finishing, the processing beam has a second power density that differs from the first power density and is dimensioned in such a way that the workpiece is not cut through, i.e., no cutting gap is created in the workpiece. Rather, the second power density is such that the workpiece is machined in a non-separating and non-joining manner.

The finishing line is a predetermined or predefinable (imaginary) path along which the processing beam is to be guided to create a finished area (finishing zone) of the workpiece along the cutting gap. The finishing line can be associated with the cutting gap, whereby the finishing line extends exclusively along the cutting gap. For example, the finishing line and the cutting line are identical. Alternatively, the finishing line and the cutting line are not identical. For example, the finishing line is laterally offset from the cutting line, whereby the finishing line can have a constant perpendicular (shortest) distance to the cutting line, i.e., the finishing line and the cutting line are equidistant lines. The finishing zone can be created along the complete finishing line. The finishing line or finishing zone can also extend over only a part of the cutting gap, whereby the term "part" here refers to the extension of the cutting gap along the cutting line.

The processes according to the present disclosure include at least one finishing procedure in which the finishing line has a course such that the workpiece is irradiated by the processing beam in a region containing a workpiece part-side cutting edge of the cutting gap and/or in a region containing a residual grid-side cut edge of the cutting gap. For the purposes of the present disclosure, the term "cutting edge" denotes the two opposing surfaces of the residual grid and the workpiece part, which together form the cutting gap. Typically, the cutting edges are perpendicular to the plane of a plate-shaped (flat) workpiece or perpendicular to a tangential plane in the region of the cutting gap of a tubular workpiece.

Finishing of the workpiece (residual grid and/or workpiece part connected thereto) is carried out along at least part of the cutting gap, with respect to the extension of the cutting gap along the cutting line. The term "region" as used herein refers to a portion of the workpiece that extends along at least a part of the cutting gap and includes at least one cut edge of the cutting gap. Thus, in addition to the cut edge, the region may also include a portion of the workpiece (i.e., residual grid or workpiece part) extending transversely to the cut edge. It is also possible that only the cutting edge on the workpiece part-side and/or the residual grid-side of the cutting gap is reworked, without further sections of the workpiece part and/or residual grid that are not part of a cutting edge and extend transversely to the cutting edge.

The term "finishing zone" encompasses an area containing the cutting edge of the cutting gap on the workpiece part-side and/or an area containing the cutting edge of the cutting gap on the residual grid-side, whereby the respective area can also consist only of the associated cutting edge.

According to an embodiment of the process according to the present disclosure, one or more finishing procedures are carried out along the complete cutting gap. According to a further embodiment of the process according to the present disclosure, one or more finishing procedures are carried out along one or more parts of the cutting gap. If the workpiece has at least one workpiece part that has only been partially cut out, the workpiece is finished by irradiation with the processing beam in a region of the workpiece part which contains a cut edge of the cutting gap on the workpiece part-side and/or in a region of the residual grid which contains a cut edge of the cutting gap on the residual grid-side. If at least one workpiece part has already been completely cut out of the workpiece and removed from the residual grid, the workpiece is only reworked in a region of the workpiece containing a cutting edge of the cutting gap on the residual grid-side.

The processes according to the present disclosure enable the creation of a cutting gap and the finishing of the workpiece (residual grid and/or workpiece part) along at least a part of the cutting gap by the processing beam. Time-consuming and cost-intensive finishing of the workpiece part removed from the residual grid can be dispensed with, so that time and costs can be saved in the production of workpiece parts. This is a great advantage of the process according to the present disclosure, especially since existing beam processing devices, in particular laser cutting devices, can also be easily retrofitted to carry out the process according to the present disclosure.

According to an embodiment of the present disclosure, the processes include only one cutting procedure and at least one finishing procedure for complete beam processing of a same workpiece. The cutting gap created in the cutting procedure extends completely or only partially along the contour of the workpiece part. If the workpiece part is only partially cut out by the cutting procedure, the at least one finishing procedure performs a finishing of the workpiece in a region of the workpiece part containing a cutting edge of the cutting gap on the workpiece part-side and/or in a region of the residual grid containing a cutting edge of the cutting gap on the residual grid-side. Several finishing procedures may also be carried out.

According to a further embodiment of the present disclosure, the processes include a plurality of cutting procedures and at least one finishing procedure for complete beam processing of a same workpiece part. The cutting gap created by the plurality of cutting procedures extends completely or only partially along the contour of the workpiece part. If the workpiece part is only partially cut out by the cutting procedures, the at least one finishing procedure finishes the workpiece in a region of the workpiece part containing a cutting edge of the cutting gap on the workpiece part-side and/or in a region of the residual grid containing a cutting edge of the cutting gap on the residual grid-side. A plurality of finishing procedures may also be performed for the same or different parts of the cutting gap. In this embodiment of the present disclosure, at least two immediately successive cutting procedures (pair of immediately successive cutting procedures) are interrupted by one or more finishing procedures.

In some embodiments, all immediately successive cutting procedures are each interrupted by one or more finishing procedures, for example, but not necessarily, with the exception of the last pair, since finishing in a region of the workpiece part containing the workpiece part-side cutting edge of the cutting gap is only possible if the workpiece part is still connected to the residual grid. However, a finishing in a region containing the residual grid-side cutting edge is also possible during the last two cutting procedures for producing the cutting gap of the workpiece part.

According to another embodiment of the present disclosure, a plurality of finishing procedures are carried out along at least one same part of the cutting gap, e.g., along the complete cutting gap. In this case, different finishing procedures for the same part of the cutting gap can have the same finishing lines and/or the same power densities or different finishing lines and/or different power densities of the processing beam.

In some embodiments of the processes according to the present disclosure, at least two finishing procedures carried out for the same part of a cutting gap have different finishing lines and/or different power densities of the processing beam.

In an embodiment of the processes according to the present disclosure for beam processing of a plate-shaped or tubular workpiece, in which at least two finishing procedures are carried out for finishing the workpiece along at least one same part of the cutting gap, in at least one first finishing procedure the workpiece is irradiated by the processing beam in a region containing a workpiece part-side cutting gap edge of the cutting gap and/or in a region containing a residual grid-side cutting gap edge of the cutting gap. In addition, in at least one second finishing procedure, the workpiece is irradiated by the processing beam in a region not containing the workpiece part-side cutting edge of the cutting gap and/or in a region not containing the residual grid-side cutting edge of the cutting gap. In this case, the at least one first finishing procedure can be performed temporally before the at least one second finishing procedure, which can be preferred, or the at least one second finishing procedure is performed temporally before the at least one first finishing procedure. This embodiment of the present disclosure is particularly advantageous when creating a chamfer at the cutting gap. In particular, the chamfer can be generated starting from the processing cutting edge. In the at least one second finishing procedure, the cutting edge no longer has to be irradiated, but the processing beam can be displaced further into the workpiece part or residual grid in the direction away from the cutting edge.

If the cutting gap is produced in several stages, according to an embodiment of the present disclosure, the workpiece is finished only along that part of the cutting gap that was produced by the immediately preceding cutting procedure. This may be the complete part of the cutting gap created by the immediately preceding cutting procedure, or only a section thereof, the term "section" here referring to the extent of the cutting gap along the cutting line. However, it is also conceivable that a finishing procedure finishes the workpiece only along that part of the cutting gap that was created by a not immediately preceding cutting procedure. This can be the complete part of the cutting gap that was created by the not immediately preceding cutting procedure, or only a section of it, whereby the term "section" here refers to the extension of the cutting gap. It is also possible for a finishing procedure to finish the workpiece along several parts of the cutting gap created by several previous cutting procedures. Each of these may be the complete part of the cutting gap produced by the previous cutting procedures, or only a section thereof, the term "section" here referring to the extent of the cutting gap.

In an embodiment of the processes according to the present disclosure, in which a plurality of cutting procedures are provided for generating the cutting gap for a same workpiece part, a portion of the cutting gap is generated in each cutting procedure. The last cutting procedure can produce a portion of the cutting gap that has a dimension (length) along the cut line that is less than any one of the dimensions (lengths) along the cut line of the portions of the cutting gap produced in one or more previous cutting procedures. For example, the lengths of the parts of the cutting gap produced in successive cutting procedures do not decrease, e.g., continuously, when viewed from a clearance point of the workpiece part, in the direction opposite to the direction in which the cutting gap is produced. Since finishing of the workpiece in a region of the workpiece part containing the cutting edge of the cutting gap on the workpiece part-side is only possible if the workpiece part is still connected to the residual grid, this measure can be used in a particularly advantageous way to ensure that the workpiece can be finished along as large a part of the cutting gap as possible. The part of the cutting gap that is not finished is thus small compared to the entire length of the cutting gap.

In an embodiment of the processes according to the present disclosure, the beam head is moved away from the second cutting position of the cutting procedure after a cutting procedure, whereby the processing beam can also be switched off for this movement. The beam head can also be moved over the workpiece, e.g., within the contour of the workpiece part to be cut. The beam head is thus moved into a position where the processing beam meets the first finishing position of the finishing line. The first finishing position is therefore different from the second cutting position of the previous cutting procedure. For example, the first finishing position of the finishing line is identical to the first cutting position of the previous cutting procedure, although it is equally possible that the first finishing position is different from the first cutting position. It is also possible that the first finishing position of the finishing line is located between the first cutting position and the second cutting position of the preceding cutting procedure, at least in perpendicular view of the cutting line or the cutting gap. For example, the second finishing position is identical to the second cutting position of the previous cutting procedure, although it is equally possible that the second finishing position is different from the second cutting position. It is also possible that the second finishing position is located between the first cutting position and the second cutting position of the preceding cutting procedure, at least in perpendicular view of the cutting line or the cutting gap.

In a further embodiment of the processes according to the present disclosure, for performing the at least one finishing procedure, the beam head is not moved away from the second cutting position of the preceding cutting procedure, so that the first finishing position of the finishing line is identical to the second cutting position of the cutting line of the preceding cutting procedure.

The direction for finishing the workpiece along the cutting gap can be the same as, or opposite to, the direction in which the cutting gap was created.

During the at least one cutting procedure, the beam axis of the processing beam can be directed perpendicularly to the plate-shaped or tubular workpiece or perpendicularly to the workpiece surface, although it is also conceivable that the beam axis deviates from the perpendicular. The beam axis of the processing beam can be directed perpendicularly to the plate-shaped or tubular workpiece or perpendicularly to the workpiece surface during the at least one finishing procedure, although it is also conceivable that the beam axis deviates from the perpendicular.

The "alignment" of the processing beam is to be understood as the angle between the center beam of the beam cone (i.e., beam axis) of the processing beam hitting the workpiece and the flat workpiece surface of the workpiece. In the case of a tubular workpiece, a tangential plane to the workpiece surface is considered at the point of impact of the beam axis. In the case of a perpendicular alignment of the processing beam, the angle between the beam axis and the workpiece surface is 90°.

In some embodiments, the orientation of the processing beam when irradiating the workpiece for finishing during the at least one finishing procedure can be unchanged and equal to an always unchanged orientation of the processing beam when irradiating the workpiece for producing the cutting gap during the at least one cutting procedure. The processing beam can be directed perpendicularly to the workpiece surface during the at least one cutting procedure and the at least one finishing procedure. The beam axis of the processing beam thus remains unchanged during the generation of the cutting gap and the finishing. This measure can considerably simplify the finishing of the workpiece in terms of control technology. In addition, costs for the technical implementation of a corresponding swiveling capability of the beam head and/or processing beam relative to the workpiece can be saved.

According to an alternative embodiment of the processes according to the present disclosure, the orientation of the processing beam when irradiating the workpiece for finishing during the at least one finishing procedure is at least temporarily different from the orientation of the processing beam during the at least one cutting procedure. In particular, the beam axis may at least temporarily assume an angle different from 90° to the workpiece surface during the finishing procedure. The alignment of the processing beam can be achieved by swiveling the beam head (mechanically) and/or swiveling the processing beam (optically).

During the at least one cutting procedure, the processing beam or its beam axis is guided along the cutting line. The cutting line thus indicates the path of the processing beam on the workpiece surface when creating the cutting gap for a workpiece part to be cut out. In the at least one finishing procedure, the processing beam or its beam axis is guided along the finishing line. The finishing line thus indicates the path of the processing beam on the workpiece surface during finishing of the workpiece along the cutting gap. When the processing beam strikes the workpiece surface perpendicularly, the beam head is moved during the cutting procedure along a traversing curve that corresponds to a projection of the cutting line in perpendicular view through the plate-shaped or tubular (flat) workpiece. It is also possible that the beam head is moved along a traverse curve parallel to this traverse curve. Correspondingly, during the finishing procedure, the beam head is moved along a traverse curve that corresponds to a projection of the finishing line in perpendicular view through the plate-shaped or tubular (flat) workpiece. It is also possible that the beam head is moved along a traverse curve parallel to this traverse curve.

The finishing line of the at least one finishing procedure is associated with the cutting line or the cutting gap and can in principle be of any design, as long as it is ensured that the workpiece can be finished by irradiation with the processing beam in a region of the workpiece part containing a cutting edge of the cutting gap on the workpiece part side and/or in a region of the residual grid containing a cutting edge of the cutting gap on the residual grid-side. According to an embodiment of the at least one finishing procedure, the finishing line is identical to the cutting line or cutting gap. In this case, the finishing line has the same course as the cutting line. According to a further embodiment of the at least one finishing procedure, the finishing line is not identical to the cutting line or cutting gap. For example, the finishing line is laterally offset relative to the cutting line, whereby the finishing line can in particular run equidistantly to the cutting line. According to an embodiment, the finishing line and the cutting line have the same shape and a parallel course.

In an embodiment of the present disclosure, a plurality of finishing procedures are performed along a same part of the cutting gap, e.g., along the entire cutting gap, where the finishing line can be offset further away from the cutting line in a subsequent finishing procedure than in a preceding finishing procedure. In particular, the finishing lines may have the same path as the cutting line. For example, the finishing lines may each be equidistant from the cutting line. This embodiment of the present disclosure may be preferred in the multi-step creation of a chamfer.

Control of the processing beam can be effected by moving the beam head and/or by changing the orientation of the beam head relative to the workpiece surface (pivoting of the beam head) and/or by changing the beam direction relative to the beam head (optical pivoting of the processing beam relative to the beam head which is unchanged in its orientation). In some embodiments, the processing beam is controlled only by corresponding movement of the beam head, whereby the orientation of the beam head relative to the workpiece surface and the orientation of the processing beam relative to the beam head remain unchanged during the beam processing of the workpiece (separating processing and finishing) in accordance with the process according to the present disclosure, which avoids complex and cost-intensive technical equipment of a processing device.

According to an embodiment of the processes according to the present disclosure, the distance of the finishing line from the cutting line (finishing line can be offset equidistantly to the cutting line) is at most half the gap width of the cutting gap with respect to a radius of a beam cone of the processing beam on the workpiece surface. However, it is also possible that the distance of the finishing line from the cutting line is greater, for example in the multi-stage production of a chamfer, in which the finishing line in a subsequent finishing procedure is arranged away from the cutting gap than the finishing line of a previous finishing procedure.

For example, the traverse curve of the blast head during the at least one finishing procedure is laterally offset (in particular equidistant) from the traverse curve of the beam head during the at least one cutting procedure. The travel curve of the beam head during the at least one finishing procedure and the travel curve of the beam head during the at least one cutting procedure may have a parallel course.

During the at least one finishing procedure, the processing beam has a second power density different from the first power density, which is measured such that a non-joining and non-cutting (but possibly re-melting) finishing of the workpiece is effected. Thus, during the finishing, neither a connection between the partially cut out workpiece part and the residual grid is created across the cutting gap, nor is the workpiece cut through. Here, the influence of the working gas is taken into account, whereby, according to experience, the power density of the processing beam can also be understood as the power density absorbed by the workpiece. A change in the power density or absorbed power density can be achieved by various measures, in particular by changing the energy of the processing beam, changing the beam focus, changing the distance of the beam head from the workpiece surface, changing the type and/or parameters of the working gas and the like. Measures for changing the power density are well known to the person skilled in the art, so that it is not necessary to go into more detail here.

For example, the second power density is less than 50%, less than 40%, less than 30%, less than 20%, less than 10% or less than 1% of the first power density.

In the process according to the present disclosure for beam processing of a plate-shaped or tubular workpiece, the finishing operations of the workpiece along the cutting gap can be carried out in a wide variety of ways, the finishing line and the second power density of the processing beam being suitably selected depending on the type of finishing operation. Different finishing operations can also be carried out in the same areas of the workpiece along the cutting gap or along the same part of the cutting gap or along the entire cutting gap. The processes according to the present disclosure can be advantageously used for a variety of finishing operations, of which seven application cases are given below as examples.

In one application, an oxide layer is removed from the cutting edge of the workpiece part and/or from the cutting edge of the cutting gap on the residual grid-side. This advantageously saves the removal of the oxide layer on the completely cut-out workpiece part. If necessary, the irradiated area can be limited to the cutting edge(s).

In a second application, burr (e.g., micro-burr) is removed from the cutting edge on the workpiece part-side and/or the residual grid-side cutting edge of the cutting gap. The burr is often located adjacent to the workpiece surface (facing the processing beam) and/or adjacent to the underside of the workpiece (facing away from the processing beam). The irradiated area may be limited to the cutting edge(s), if necessary.

In a third application, the cutting edge on the workpiece-side and/or the residual grid-side of the cutting gap is rounded (by re-melting). In this case, the finishing line can be laterally offset relative to the cutting line in the direction of the cutting edge to be machined, preferably by a maximum of half the width of the cutting gap plus the radius of the beam cone of the processing beam on the workpiece surface.

In a fourth application, the shape of the cutting edge on the workpiece part-side and/or the cutting edge of the cutting gap on the residual grid-side is changed (by re-melting), for example smoothed or roughened, for example to improve a joining process.

In a fifth application, a chamfer is created on the cutting edge on the workpiece part-side and/or the cutting edge of the cutting gap on the residual grid-side. This can also be done in several steps, whereby according to a preferred embodiment, the finishing line is arranged further away from the associated cutting edge with each subsequent finishing operation.

In a sixth application, the cutting edge on the workpiece part-side and/or a region of the partially cut out workpiece part which contains the cutting edge on the workpiece part-side and/or the residual grid-side cutting edge of the cut gap and/or a region of the residual grid which contains the residual grid-side cut edge are provided with a coating (e.g., zinc coating) during the finishing. This can be done in a simple way by adding a coating-generating substance (e.g., zinc) to a second working gas beam. The second working gas beam is different from the (first) working gas beam which is coaxial to the working beam. The area irradiated by the second working gas beam can be limited to the cutting edge(s), if necessary. The coating can also be carried out in several steps, whereby according to a preferred embodiment, the finishing line is arranged further away from the associated cutting edge for each subsequent finishing step. This measure enables coated workpieces to be thermally separated by a cutting beam in a particularly advantageous manner. A possible subsequent coating of the completely cut out workpiece part is not necessary.

The processes according to the present disclosure for beam processing of a workpiece are not limited to the applications described above. Rather, numerous other applications are conceivable in which the processes according to the present disclosure can be advantageously used.

When finishing the workpiece, the applications described herein as well as further applications can be realized individually or in any combination along the same or different parts of the cutting gap, in particular along the complete cutting gap.

According to the present disclosure, the at least one finishing procedure for finishing the workpiece is not used for laser hardening, laser annealing, or laser soft annealing.

In the processes according to the present disclosure for beam processing of a workpiece, the processing beam is guided by the beam head and exits at a terminal beam nozzle provided with a beam nozzle opening. Typically, but not necessarily, the beam nozzle tapers conically towards the workpiece or the workpiece support. The beam nozzle opening is typically, but not necessarily, round. The processing beam is typically, but not necessarily, in the form of a beam cone hitting the workpiece. Typically, the beam head also serves to guide a (first) working gas beam, which is typically, but not necessarily, emitted from the same beam nozzle as the processing beam and is preferably guided coaxially to the processing beam. The (first) working gas beam emerging from the beam nozzle of the beam head is typically, but not necessarily, in the form of a gas cone hitting the workpiece. As mentioned above, the beam head may also serve to guide a second working gas beam, different from the first working gas beam, which serves to transport coating material and does not emerge from the same hole of the beam head as the processing beam.

The beam head can be moved relative to the workpiece. The workpiece, which typically rests on a flat workpiece support, has a workpiece surface, for example a flat surface, opposite the beam head, onto which the processing beam and the working gas beam can be directed for cutting processing and for finishing the workpiece.

In another aspect, the present disclosure further extends to beam processing devices with a processing beam guided by a beam head for beam processing a plate-shaped or tubular workpiece, which have an electronic control device for controlling/regulating the beam processing of the workpiece, which is set up to carry out the processes according to the present disclosure described herein (programmatically).

In another aspect, the present disclosure extends to program code for an electronic control device suitable for data processing for such a beam processing device, which contain control commands that cause control devices to carry out the process according to the present disclosure as described herein.

Furthermore, the present disclosure extends to computer program products (e.g., a tangible, non-transitory computer-readable storage medium) with a stored program code for an electronic control device suitable for data processing for such beam processing devices, which contain control commands that cause the control devices to carry out the processes described in the present disclosure.

It is understood that the above-mentioned embodiments of the present disclosure can be used in any setting or combination without departing from the scope of the present disclosure.

DESCRIPTION OF DRAWINGS

The present disclosure will now be explained in more detail with reference to examples of embodiments, with reference to the accompanying figures:

FIGS. 16-21 are schematic side views that show various applications for finishing a workpiece.

DETAILED DESCRIPTION

Figure 22:
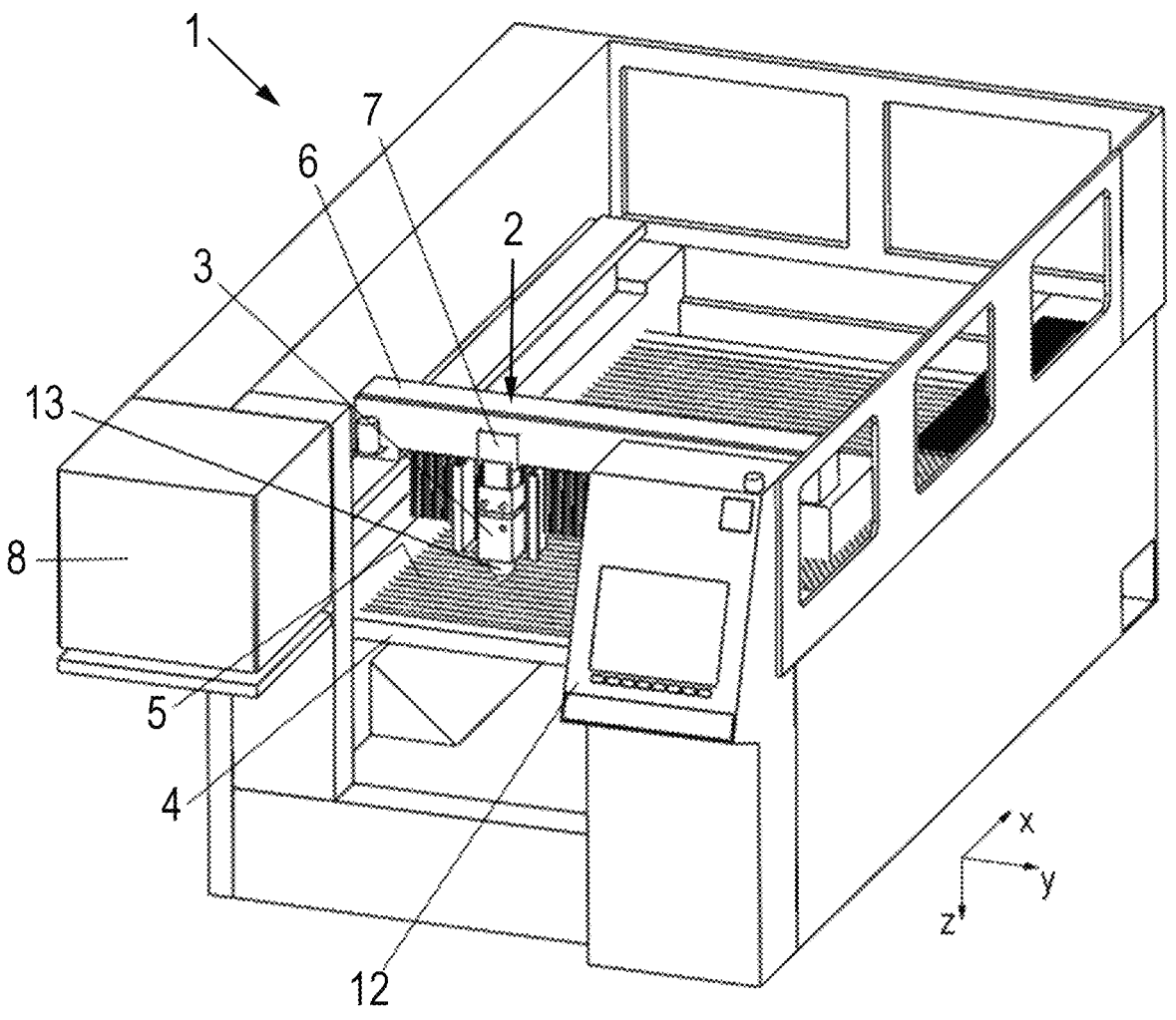
FIG. 22 is a schematic perspective representation of a representative beam processing device for carrying out the processes according to the present disclosure for beam processing of a workpiece.

First of all, FIG. 22 illustrates a beam processing device known per se for the beam cutting of plate-like workpieces. The beam processing device, altogether designated with the reference number 1, includes a beam cutting device 2 with a beam head 3, as well as a work table 4 with a workpiece support 5 for a workpiece 9 (not shown in FIG. 22, see FIGS. 1 to 15), for example a flat sheet metal plate. The workpiece support 5 is spanned by a cross member 6, which is guided so that it can be moved along a first axial direction (x-direction).

A guide carriage 7 for the beam head 3 is mounted on the cross member 6, which is guided on the cross member 6 so that it can move along a second axial direction (y-direction) perpendicular to the first axial direction. The beam head 3 can thus be moved in a plane spanned by the two axial directions (x-, y-direction) parallel and relative to, for example, the horizontal workpiece support 5. Furthermore, the beam head 3 is configured to be vertically movable in a third axial direction (z-direction) perpendicular to the first and second axial directions, whereby the distance perpendicular to the workpiece support 5 can be changed. In the case of a horizontal workpiece support 5, the z-direction corresponds to the direction of gravity. On its side facing the workpiece support 5, the beam head 3 has a conically tapering beam nozzle 13 towards the workpiece support 5. The beam head 3 serves to guide a processing beam, here for example a laser beam, as well as a working gas beam. The processing beam is generated by a processing beam source 8 and guided to the beam head 3, for example, by a beam guiding tube and one or more deflecting mirrors or a light guiding cable. A focusing lens or adaptive optics can be used to direct the processing beam onto the workpiece in a bundled form. Because the beam head 3 can be moved along the first axis direction (x-direction) and the second axis direction (y-direction), the processing beam can approach any point on the workpiece. The working distance of the beam nozzle 13 to the workpiece can be adjusted by changing the distance to the workpiece surface through the height adjustment of the beam head 3 in the z-direction. The distance of the beam head 3 from the workpiece surface, e.g., the cutting height, can be adjusted before, during and after the cutting process. Cutting processing of the workpiece can be carried out, for example, with a variable cutting height within a cutting height range. The focus position of the processing beam can be adjusted via optical elements in the beam head 3, for example adaptive optics.

A first working gas beam (not shown in more detail) is used to drive the melt out of the cutting gap. The working gas beam is generated by a gas beam generation device (not shown in more detail). The inert working gas used is, for example, helium (He), argon (Ar) or nitrogen ($N_2$). Oxygen ($O_2$) can be used as the reactive working gas. The use of gas mixtures is also known. The working gas beam emerges from the same beam nozzle 13 as the processing beam 16 and is guided coaxially to the processing beam 16 to the processing point and impinges there on the workpiece surface of the workpiece with an (initial) gas pressure predetermined by the gas beam generation device.

As shown in FIG. 22, the workpiece support 5 consists, for example, of a number of support elements with, for example, triangular support point peaks, which together define a support plane for the workpiece 9 to be machined. The support elements are designed here, for example, as elongated support webs which each extend along the y-direction and are arranged next to one another in a parallel arrangement along the x-direction with, for example, a constant intermediate spacing. An extraction device is not shown in more detail, by means of which cutting smoke, slag particles and small waste parts produced during the beam cutting can be extracted.

A program-controlled control device 12 serves to control/regulate the process according to the present disclosure for beam processing the workpiece 9 in the beam device 1.

Reference is now made to FIGS. 1 to 15, in which a representative process for the beam processing of a workpiece by the beam processing device 1 of FIG. 22 is illustrated.

Figures 1, 2, 3:
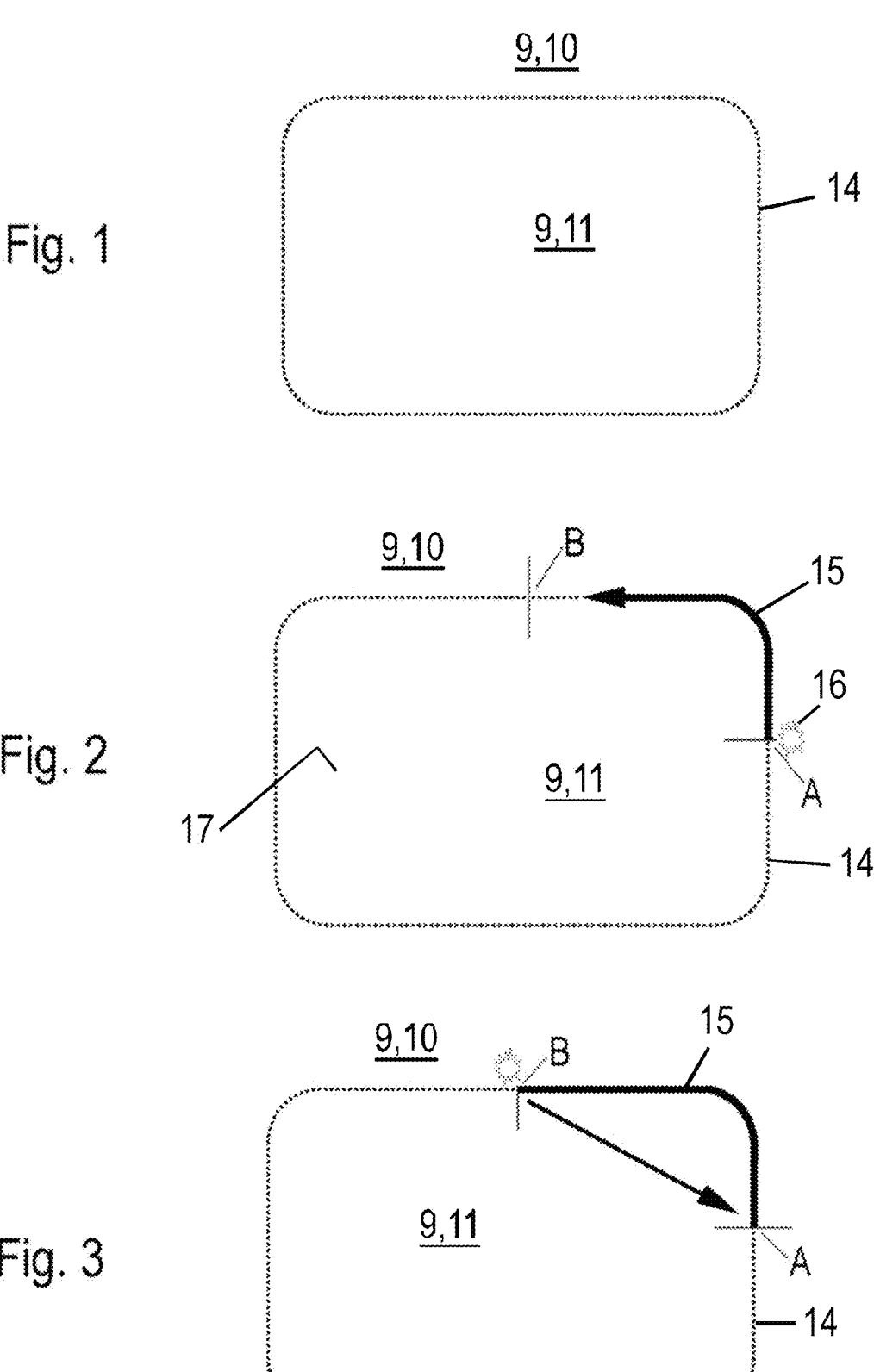
FIGS. 1-15 are schematic diagrams that show a representative process for beam processing a workpiece as disclosed herein.

FIG. 1 shows a cutting line 14 (dashed line), which corresponds to the complete contour of a workpiece part 11. The contour corresponds to the outer shape or form of the workpiece part 11 to be cut out. The workpiece part 11 is to be cut out completely from the plate-shaped or tubular workpiece 9, which is not shown in greater detail, leaving the residual grid 10. The workpiece part 11 here has, for example, a rectangular shape with rounded corners, whereby it is understood that the workpiece part 11 can have any desired shape.

FIG. 2 schematically illustrates the processing beam 16, for example, a laser beam, emerging from the beam head 3. The beam head 3 has been moved to a position above the cutting line 14, in which the processing beam 16 meets a first cutting position A of the cutting line 14 with its beam axis. As shown in FIG. 2, the beam head 3 is moved along the cutting line 14, whereby the processing beam 16 is moved from the first cutting position A to a second cutting position B. This causes the workpiece 9 to be machined. This creates a cutting gap 15 (solid line) between the first cutting position A and the second cutting position B, which breaks through the workpiece 9. It is understood that the processing beam 16 can also penetrate the workpiece 9 at a distance from the cutting line 14, in which case, according to the present disclosure, only a cutting line 14 running along the contour of the workpiece part 11 and accordingly a cutting gap 15 forming the contour of the workpiece part 11 is considered.

FIG. 3 illustrates a situation in which the cutting gap 15 has been created between the first cutting position A and the second cutting position B. The cutting operation on the workpiece 9 is now interrupted and the first cutting procedure is finished. The processing beam 16 is switched off and the beam head 3 is moved to a position above the first cutting position A of the cutting line 14. As illustrated by an arrow in FIG. 3, the traversing movement of the beam head 3 within the cutting line 14, i.e., above the workpiece part 11 to be cut out, can take place in a direct line between the second cutting position B and the first cutting position A of the cutting line 14. The first cutting position A corresponds to the first finishing position of a finishing line 18 (see FIG. 4).

Figures 4, 5, 6:
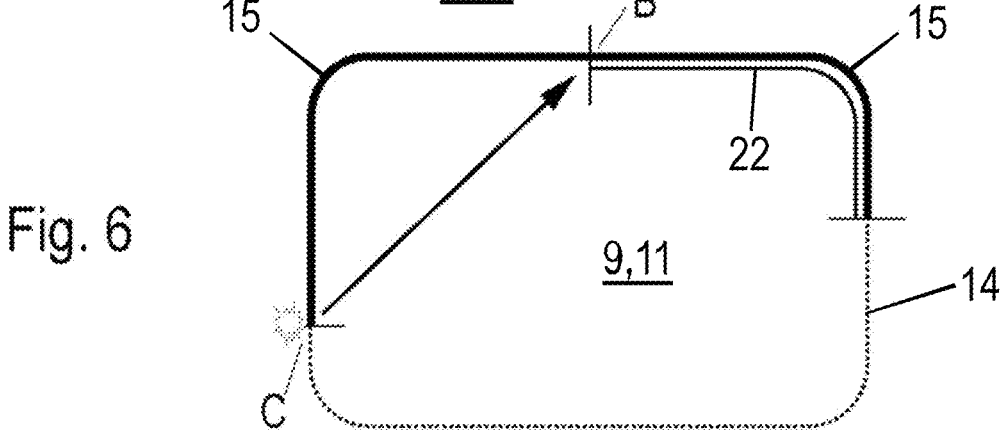

As illustrated in FIG. 4, the processing beam 16 is now switched on again and the beam head 3 is moved along the finishing line 18 (dashed line), whereby the processing beam 16 is moved from the first finishing position corresponding to the first cutting position A to a second finishing position corresponding to the second cutting position B. In the process, a finishing zone is formed between the first cutting position A and the second cutting position B of the cutting line 14. This creates a finishing zone 22 (schematically illustrated by the solid line).

FIG. 5 shows a situation in which the workpiece 9 has been finished along the entire cutting gap 15 of the first cutting procedure. The finished area or finishing zone 22 is schematically illustrated with a solid line.

In FIG. 4 and the further FIGS. 5 to 15, the finishing line 18 or the finishing zone 22 is shown offset parallel and equidistant to the cutting line 14 for display reasons. This also corresponds to a preferred positioning of the finishing line 18 for certain applications. For the finishing described here as an example, the finishing line 18 should be identical to the cutting line 14, which corresponds to an equally preferred positioning of the finishing line 18 for certain applications, but cannot be represented well in the drawing. When the processing beam 16 has reached the second finishing position corresponding to the second cutting position B, the first finishing procedure is finished.

As further illustrated in FIG. 5, after completion of the first finishing procedure, starting from the second cutting position B, which represents the first cutting position for the now following second cutting procedure, the workpiece 9 is further cut, whereby the already created part of the cutting gap 15 is extended to the second cutting position C of the second cutting procedure.

FIG. 6 illustrates a situation in which the cutting gap 15 has been created between the first cutting position B and the second cutting position C of the second cutting procedure. The second cutting procedure has ended here and the cutting operation on the workpiece 9 is interrupted. The processing beam 16 is switched off and the beam head 3 is moved to a position above the first cutting position B of the cutting line 14, as illustrated by an arrow. The first cutting position B of the second cutting procedure corresponds to the first finishing position of the finishing line 18 for the second finishing procedure (see FIG. 7).

Figures 7, 8, 9:
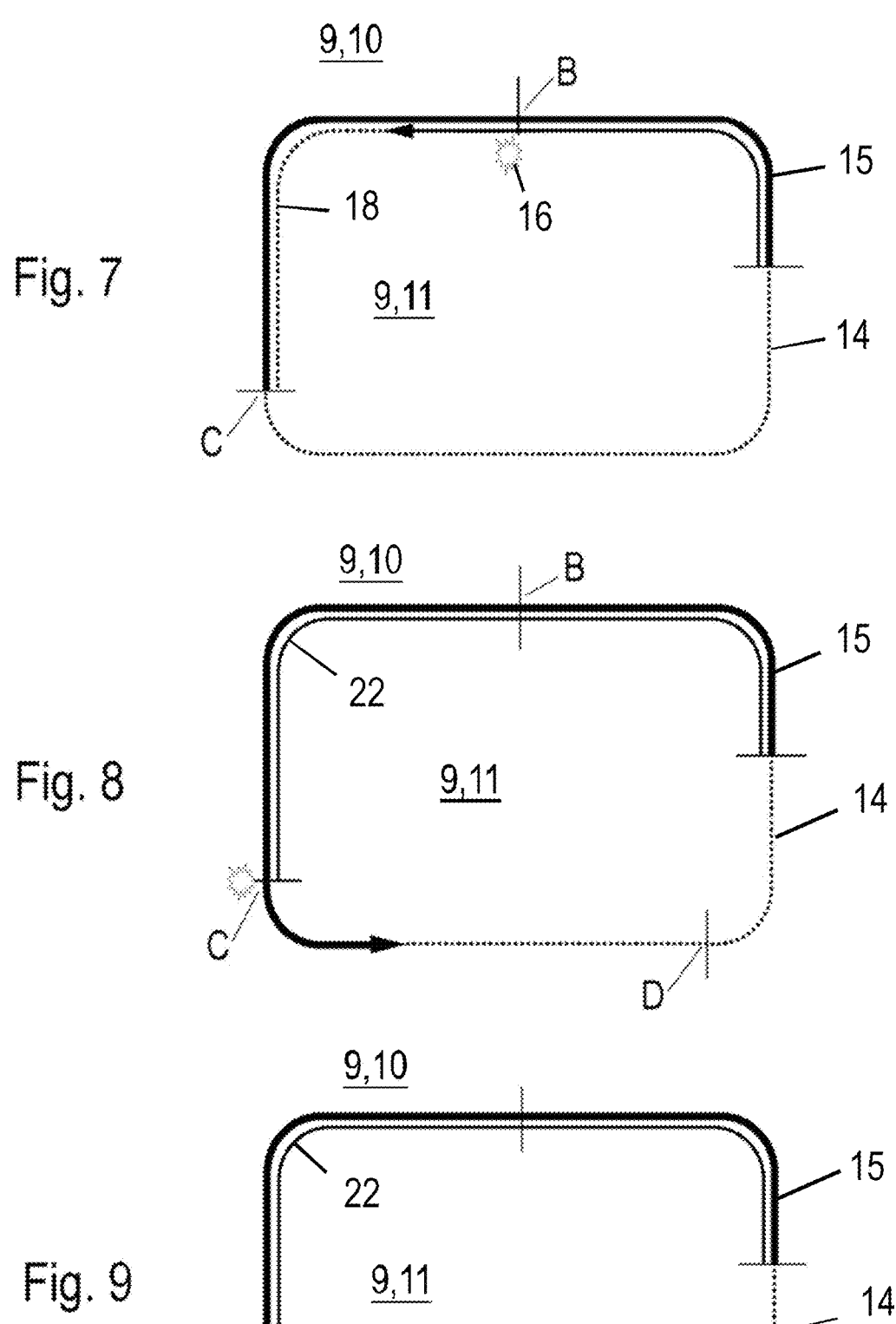

As illustrated in FIG. 7, the processing beam 16 is switched on again and the beam head 3 is moved along the finishing line 18, whereby the processing beam 16 is moved from the first finishing position corresponding to the first cutting position B of the second cutting procedure to a second finishing position corresponding to the second cutting position C.

FIG. 8 shows a situation in which the workpiece 9 has been reworked along the entire cutting gap 15 between the first finishing position corresponding to the first cutting position B of the second cutting procedure and the second finishing position corresponding to the second cutting position C of the second cutting procedure. The second finishing procedure is thus completed.

As illustrated in FIG. 8, after the second finishing procedure has been completed, starting from the second cutting position C, which represents the first cutting position for the now following third cutting procedure, the workpiece 9 is further cut, whereby the already created part of the cutting gap 15 is extended to the second cutting position D of the third cutting procedure.

FIG. 9 illustrates a situation in which the cutting gap 15 has been created between the first cutting position C and the second cutting position D of the third cutting procedure. The third cutting procedure has ended here and the cutting operation on the workpiece 9 is interrupted. The processing beam 16 is switched off and the beam head 3 is moved to a position above the first cutting position C of the third cutting procedure of the cutting line 14. The first cutting position C of the third cutting procedure corresponds to the first finishing position of the finishing line 18 for the third finishing procedure (see FIG. 10).

Figures 10, 11, 12:
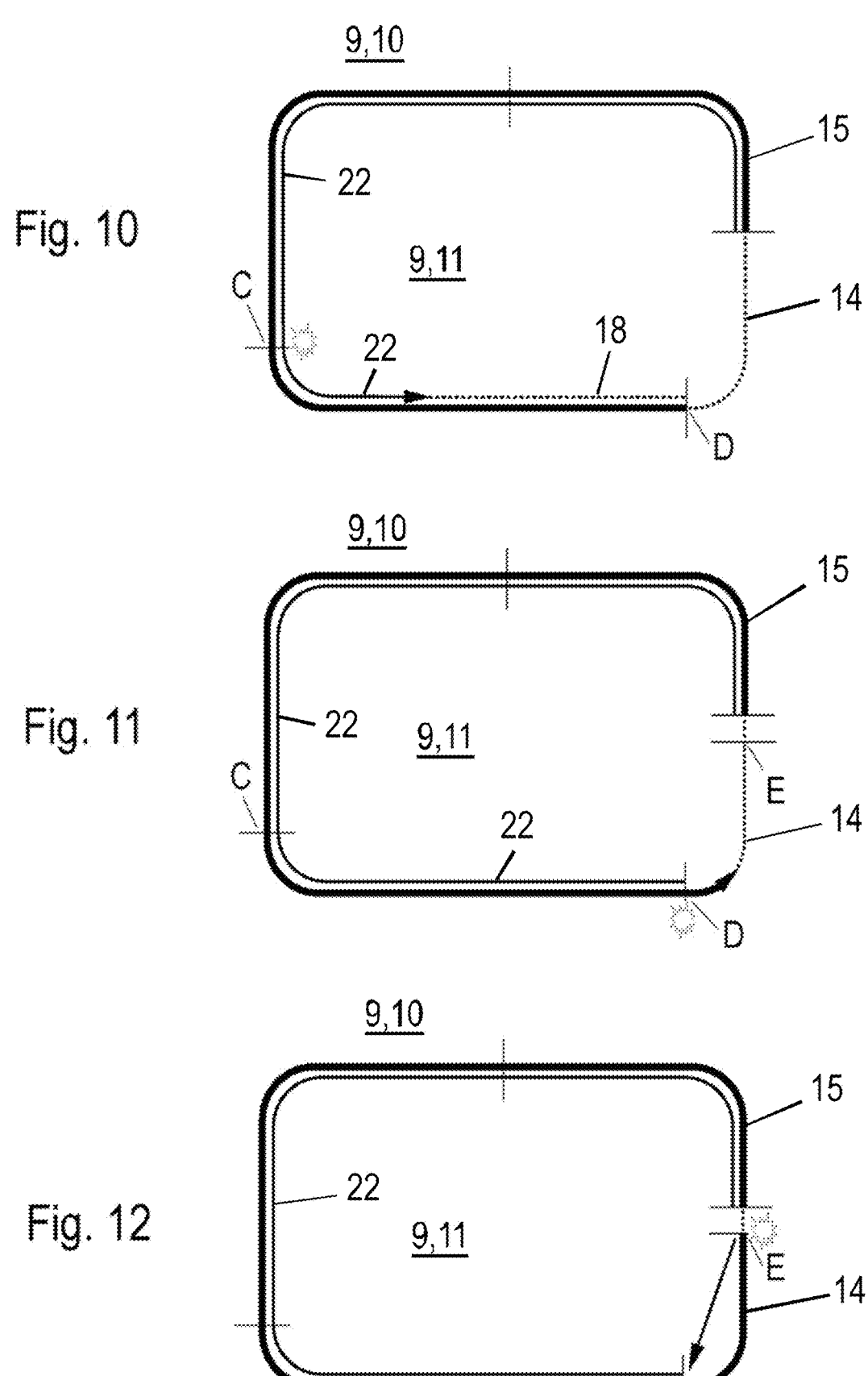

As illustrated in FIG. 10, the processing beam 16 is switched on again and the beam head 3 is moved along the finishing line 18, whereby the processing beam 16 is moved from the first finishing position corresponding to the first cutting position C of the third cutting procedure to a second finishing position corresponding to the second cutting position D of the third cutting procedure.

FIG. 11 shows a situation in which the workpiece 9 has been finished along the entire cutting gap 15 between the first finishing position corresponding to the first cutting position C of the third cutting procedure and the second finishing position corresponding to the second cutting position D of the third cutting procedure. The third finishing procedure is thus completed.

As illustrated in FIG. 11, after completion of the third finishing procedure, starting from the second cutting position D of the third cutting procedure, which represents the first cutting position for the now following fourth cutting procedure, the workpiece 9 is further cut, whereby the already created part of the cutting gap 15 is extended to the second cutting position E of the fourth cutting procedure.

FIG. 12 illustrates a situation in which the cutting gap 15 has been created between the first cutting position D and the second cutting position E of the fourth cutting procedure. The fourth cutting procedure has ended here and the cutting processing of the workpiece 9 is interrupted. The processing beam 16 is switched off and the beam head 3 is moved to a position above the first cutting position D of the fourth cutting procedure of the cutting line 14. The first cutting position D of the fourth cutting procedure corresponds to the first finishing position of the finishing line 18 for the fourth finishing procedure (see FIG. 13).

Figures 13, 14, 15:
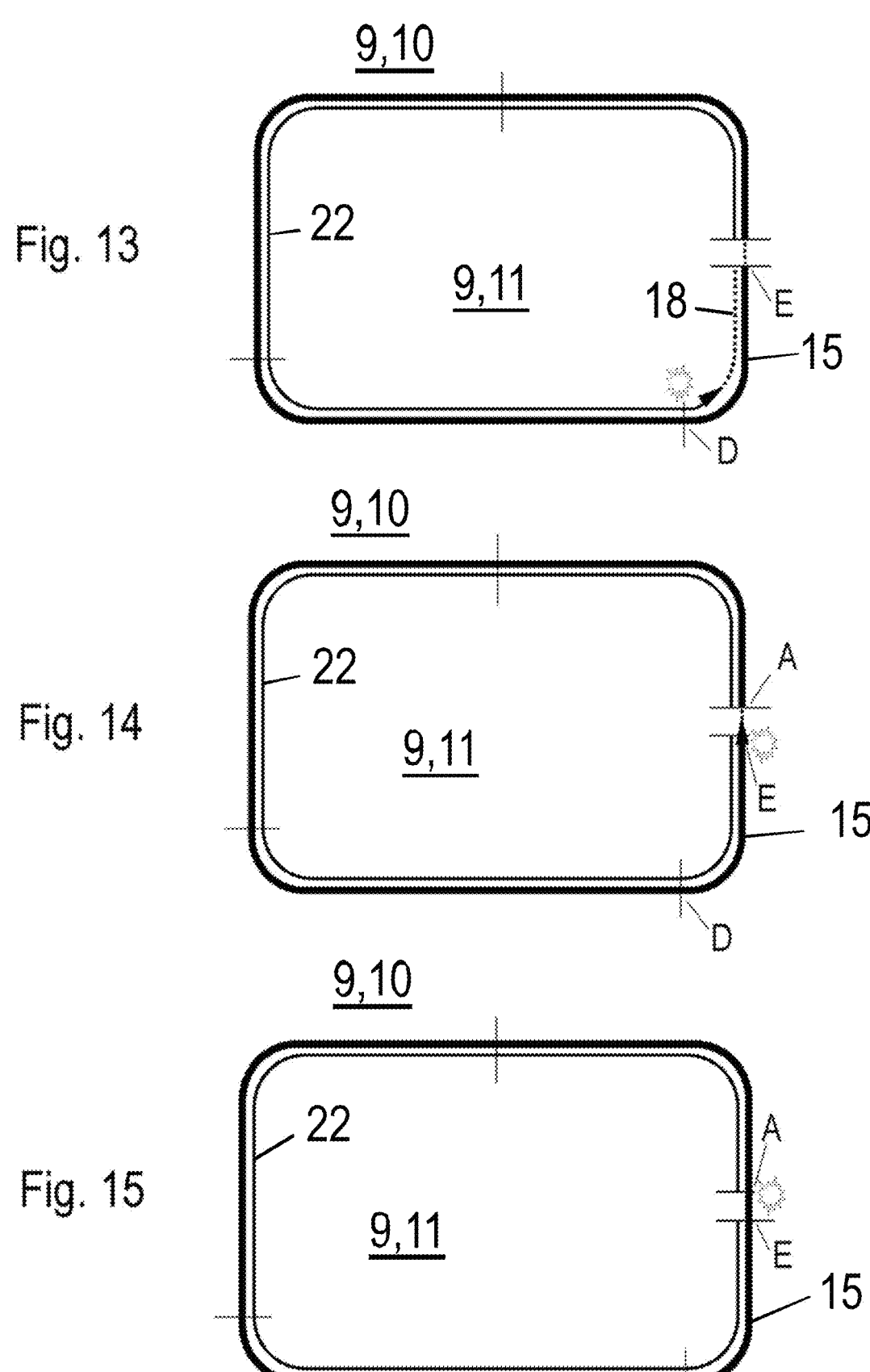

As illustrated in FIG. 13, the processing beam 16 is switched on again and the beam head 3 is moved along the finishing line 18, whereby the beam 16 is moved from the first finishing position corresponding to the first cutting position D of the fourth cutting procedure to a second finishing position corresponding to the second cutting position E of the fourth cutting procedure.

FIG. 14 shows a situation in which the workpiece 9 has been finished along the entire cutting gap 15 between the first finishing position corresponding to the first cutting position D of the fourth cutting procedure and the second finishing position corresponding to the second cutting position E of the fourth cutting procedure. The fourth finishing procedure is thus completed.

As illustrated in FIG. 15, after the fourth finishing procedure has been completed, starting from the second cutting position E of the fourth cutting procedure, which represents the first cutting position for the now following fifth cutting procedure, the workpiece 9 is further cut, whereby the already created part of the cutting gap 15 is extended to the second cutting position A of the fifth cutting procedure. Hereby the workpiece part is cut free from the remaining grid 10 and can be removed. There is no finishing of the workpiece 9 along the part of the cutting gap 15 created in the fifth separation procedure, since the workpiece part 11 has already been cut free and, according to the present disclosure, no finishing is performed on the cut free workpiece part 11.

In all cutting procedures, the processing beam 16 has a first power density which is such that the workpiece 9 is cut through. In all finishing procedures, the processing beam 16 has a second power density which is dimensioned in such a way that the workpiece 9 is processed in neither a joining nor a cutting manner. In this way, the workpiece 9 is finished along the cutting gap 15, whereby, depending on the application, the workpiece 9 is irradiated by the processing beam 16 in a region containing a workpiece part-side cutting edge of the cutting gap 15 and/or in a region containing a residual grid-side cutting edge of the cutting gap 15.

The beam axis of the processing beam 16 is, for example, axially parallel to the conical beam nozzle 13 and impinges perpendicularly on the workpiece 9. In all cutting procedures and all finishing procedures, the processing beam 16 is directed onto the workpiece surface 17 with an unchanged orientation of its beam axis relative to the workpiece surface 17 (e.g. 90°).

The finishing procedures can be varied in many ways. For example, the finishing line 18 can be laterally offset (equidistant) from the cut line 14. For example, the first finishing position and the second finishing position can be positioned such that the workpiece 9 is only finished along a portion of the cutting gap 15. For example, the direction of the finishing can be opposite to the direction of creation of the cutting gap 15. Furthermore, it can be possible for several finishing procedures to be performed on the same part of the cutting gap 15.

In some examples, as shown in FIG. 14, the last cutting procedure creates a part of the cutting gap 15 whose length is smaller than the respective lengths of the parts of the cutting gap 15 created in all previous cutting procedures. By this measure, it can be achieved that as small a part of the cutting gap 15 as possible is not subjected to any finishing. It can also be possible for the lengths of the parts of the cutting gap 15 produced in the cutting procedures to increase continuously, for example, starting from the free-cutting point of the workpiece part 11.

Reference is now made to FIGS. 16 to 21, in which various applications for finishing the workpiece 9 in the process according to FIGS. 1 to 15 are illustrated.

In FIG. 16, oxide layers are removed from the workpiece part-side cutting edge 19 and the residual grid-side cutting edge 19' of the cutting gap 15 during the finishing operation by the processing beam 16. The oxide layers can be easily removed by flaking. The processing beam 16 penetrates the cutting gap 15 and is focused so that both cutting gap edges 19, 19' are irradiated. The finishing line 18 may be identical to or different from the cutting line 14.

Figures 19, 20, 21:
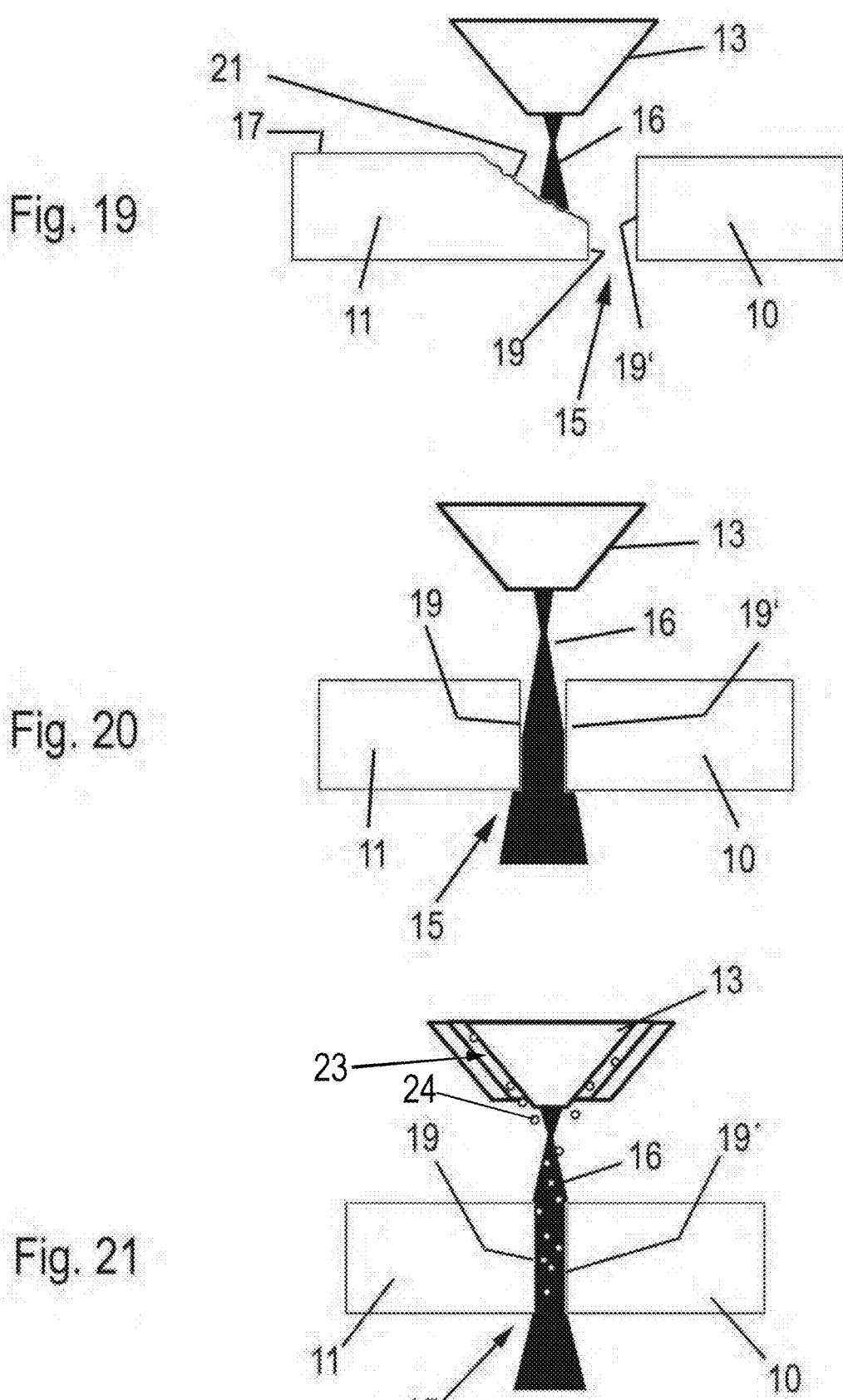

In the configuration of FIG. 16, a coating (e.g., zinc coating) may subsequently be applied to the workpiece part-side cut edge 19 and the residual grid-side cut edge 19' of the cutting gap 15 to remove the oxide layers or alternatively to remove the oxide layers. This is shown in FIG. 21, in which a second working gas beam 23 guided coaxially to the processing beam 16 is illustrated the coating material 24 (e.g., zinc) transported therein. The coating material 24 is added to the second working gas beam 23, which can completely irradiate both cutting edges 19, 19', with the result that the coating material 24 is deposited there and forms a coating (e.g., zinc coating).

In FIG. 17, during the finishing operation by the processing beam 16, the workpiece part-side cutting edge 19 of the workpiece part 11 adjacent to the workpiece surface 17 is rounded by re-melting. The finishing line 18 can be arranged laterally (e.g., equidistantly) offset relative to the cutting line 14, whereby it is preferable if a maximum distance between finishing line 18 and cutting line 14 is half the cutting gap width of the cutting gap 15 plus the radius of the beam cone of the processing beam 16 at the workpiece surface 17.

In FIG. 18, during the finishing operation by the processing beam 16, the workpiece part-side cutting edge 19 adjacent to the workpiece underside 20 is simultaneously rounded and the residual grid-side cutting edge 19' adjacent to the workpiece surface 17 is smoothed. The finishing line 18 can be the same as the cutting line or offset laterally (e.g., equidistantly) relative to the cutting line 14.

In FIG. 19, during finishing by the processing beam 16, the workpiece part-side cutting edge 19 adjacent to the workpiece surface 17 is provided with a chamfer 21. The finishing line 18 is laterally offset (e.g., equidistant) relative to the cutting line 14. Here, the chamfer 21 is created by several steps or finishing procedures performed on the same part of the cutting gap 15. In a first finishing procedure, the workpiece part 11 is irradiated in an area containing the workpiece part-side cutting edge 19. The finishing line 18 may be the same as the cutting line or laterally offset (e.g., equidistant) relative to the cutting line 14 (in the direction of the workpiece part). This can be repeated one or more times if necessary. In one or more subsequent finishing procedures, the finishing line 18 is offset even further towards or across the workpiece part 11 to form the chamfer 21 further away from the workpiece part-side cutting edge 19. In this case, the cutting edge 19 on the workpiece part side may no longer be beam processed. It would also be conceivable to first irradiate the workpiece part 11 in such a way that an area not containing the cutting edge 19 on the workpiece part side is irradiated, followed by a continuous shifting of the finishing line 18 in the direction of the cutting gap 15, whereby finally the cutting edge 19 on the workpiece part side is also irradiated.

In FIG. 20, burr is simultaneously removed from the workpiece part-side cutting edge 19 adjacent to the workpiece underside 20 and from the residual grid-side cutting edge 19' adjacent to the workpiece underside 20 during the finishing operation by the processing beam 16. The finishing line 18 can be identical to or different from the cutting line 14. The focus position of the processing beam 16 is adjusted so that the two cut edges 19, 19' are irradiated accordingly.

The different applications can be provided individually or in any combination, in which case two or more finishing procedures are carried out along the same part of the cutting gap 15 or along the complete cutting gap 15.

Figure 23:
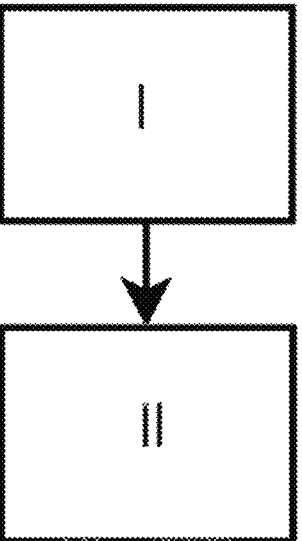
FIG. 23 is a flow diagram of one of the processes according to the present disclosure.

FIG. 23 shows a flow diagram of the process according to the present disclosure.

The process includes at least one cutting procedure (procedure I) for producing a cutting gap along a cutting line which extends at least partially along the contour of a workpiece part to be produced from the workpiece, the cutting procedure including: moving a beam head above the workpiece to guide a processing beam, where the processing beam is guided along the cutting line from a first cutting position to a second cutting position, and the processing beam has a first power density that is sized to cut through the workpiece. Thereafter, at least one finishing procedure (procedure II) is performed to finish the workpiece along at least a portion of the cutting gap, the finishing procedure including: moving the beam head over the workpiece, where the processing beam is guided along a finishing line from a first finishing position to a second finishing position, where the processing beam has a second power density such that the workpiece is not cut, and where the finishing line has such a path that the workpiece is irradiated by the processing beam along at least a part of the cutting gap in a region containing a workpiece part-side cutting edge of the cutting gap and/or in a region containing a residual grid-side cutting edge of the cutting gap, whereby a finishing zone is generated.

As can be seen from the above description, the present disclosure provides novel beam processing processes for a plate-shaped or tubular workpiece by which a workpiece part is partially or completely cut out and the non-cut-out workpiece part and/or the residual grid along the cutting gap is subjected to a finishing treatment by the processing beam with a lower power density. This makes mechanical finishing of the cut-out workpiece part unnecessary, so that the production of workpiece parts can be carried out more simply, more quickly and more economically. An implementation of the process according to the present disclosure in already existing beam processing devices is possible in a simple way without having to provide for complex technical measures. Rather, a desired finishing of a workpiece part still connected to the residual grid or of the residual grid itself can be realized by the process according to the present disclosure by merely intervening in the machine control.

OTHER EMBODIMENTS

A number of embodiments of the present disclosure have been described. Nevertheless, it will be understood that various modifications may be made without departing from the spirit and scope of the present disclosure. Accordingly, other embodiments are within the scope of the following claims.

LIST OF REFERENCE SIGNS

1 Beam processing device
2 Beam cutting device
3 Beam head
4 Work table
5 Workpiece support
6 Cross member
7 Guide carriage
8 Processing beam source
9 Workpiece
10 Residual grid
11 Workpiece part
12 Control device
13 Beam nozzle

14 Cutting line
15 Cutting gap
16 Processing beam
17 Workpiece surface
18 Finishing line
19, 19' Cutting edge
20 Workpiece underside
21 Chamfer
22 Finishing zone
23 Second working gas beam
24 Coating material

What is claimed is:

1. A process for beam processing of a plate-shaped or tubular workpiece to produce a workpiece part from the workpiece, leaving a residual grid, by a beam processing device comprising an electronic control device, wherein the electronic control device comprises at least one processor and at least one non-transitory machine readable storage medium storing machine-executable instructions executable by the at least one processor to perform the process, the process comprising:

a) carrying out a plurality of cutting procedures for producing a cutting gap along a cutting line that extends at least partially along a contour of the workpiece part to be produced from the workpiece, wherein each of the plurality of cutting procedures comprises:
moving a beam head for guiding a processing beam above the workpiece, wherein the processing beam is guided along a respective portion of a plurality of portions of the cutting line, and wherein the processing beam has a first power density configured such that the workpiece is cut through, b) carrying out at least one finishing procedure for finishing the workpiece along at least one finishing line corresponding to at least one part of the cutting gap, wherein the workpiece part is not completely cut out, and wherein a finishing procedure of the at least one finishing procedure comprises:
moving the beam head over the workpiece, wherein the processing beam is guided along a finishing line, wherein the processing beam has a second power density smaller than the first power density and configured such that the workpiece is not cut through, and wherein the workpiece is irradiated by the processing beam, along the finishing line corresponding to a part of the cutting gap, in at least one of a region containing a first cutting edge on the workpiece part to be produced or a region containing a second cutting edge on the residual grid to be produced, the first cutting edge and the second cutting edge defining the part of the cutting gap, wherein the plurality of cutting procedures comprises a first cutting procedure for creating a first part of the cutting gap from a first cutting position to a second cutting position and a second cutting procedure for creating a second part of the cutting gap from the second cutting position to a third cutting position, the second cutting procedure being immediately after the first cutting procedure among the plurality of cutting procedures, and a first finishing procedure is performed after the first cutting procedure and before the second cutting procedure and along a first finishing line from a first finishing position to a second finishing position, the first finishing line corresponding to the created first part of the cutting gap, and the second cutting procedure is performed after a completion of the first finishing procedure.

2. The process of claim 1, wherein carrying out the at least one finishing procedure comprises carrying out a plurality of finishing procedures along the at least one finishing line corresponding to the at least one part of the cutting gap.

3. The process of claim 2, wherein at least two finishing procedures carried out for a same part of the cutting gap have at least one of different finishing lines or different power densities of the processing beam.

4. The process of claim 2, wherein at least two finishing procedures are performed for finishing the workpiece for at least one same part of the cutting gap, and wherein (i) in at least one first finishing procedure, the workpiece is irradiated by the processing beam in at least one of the region containing the workpiece part-side cut edge of the cutting gap or the region containing the residual grid-side cut edge of the cutting gap, and (ii) in at least one second finishing procedure, the workpiece is irradiated by the processing beam in at least one of a region not containing the workpiece part-side cutting edge of the cutting gap or a region not containing the residual grid-side cutting edge of the cutting gap, wherein the at least one first finishing procedure is carried out in time before the at least one second finishing procedure, or the at least one second finishing procedure is carried out in time before the at least one first finishing procedure.

5. The process of claim 1, wherein, in a last cutting procedure for generating the cutting gap, a last part of the cutting gap is generated, and wherein the last part has a length smaller than a respective length of each of other parts of the cutting gap generated in all preceding cutting procedures.

6. The process of claim 5, wherein the respective lengths of the other parts of the cutting gap produced in the plurality of cutting procedures, starting from a free-cutting point of the workpiece part, do not decrease counter to a direction for producing the cutting gap.

7. The process of claim 1, wherein, in a last cutting procedure for generating the cutting gap, a last part of the cutting gap is generated to thereby cut free the workpiece part from the workpiece, and no finishing procedure is performed on the cut free workpiece part.

8. The process of claim 1, wherein an orientation of the processing beam relative to the workpiece during the at least one finishing procedure is same as an orientation of the processing beam relative to the workpiece during the at least one cutting procedure.

9. The process of claim 1, wherein an orientation of the processing beam relative to the workpiece during the at least one finishing procedure is at least temporarily different from an orientation of the processing beam relative to the workpiece during the at least one cutting procedure.

10. The process of claim 1, wherein the finishing line of the at least one finishing procedure is laterally offset relative to the cutting line.

11. The process of claim 1, wherein one or more of the following finishing operations are carried out in the at least one finishing procedure:

i) removing burr from at least one of the workpiece part-side cutting edge or the residual grid-side cutting edge of the cutting gap, ii) rounding at least one of the workpiece part-side cutting edge or the residual grid-side cutting edge of the cutting gap,

iii) changing a shape of the cutting edge on at least one of the workpiece part-side cutting edge or the residual grid-side cutting edge of the cutting gap, iv) creating a chamfer along the cutting gap, and v) coating the workpiece along the cutting gap in a region containing at least one of the workpiece part-side cutting edge or the residual grid-side cutting edge of the cutting gap with a substance contained in a working gas beam.

12. A beam processing device with a processing beam guided by a beam head, wherein the beam processing device comprises an electronic control device for controlling beam processing of a plate-shaped or tubular workpiece to produce a workpiece part from the workpiece, leaving a residual grid, and wherein the electronic control device comprises:

at least one processor; and at least one non-transitory machine readable storage medium coupled to the at least one processor having machine-executable instructions stored thereon that, when executed by the at least one processor, cause the at least one processor to perform operations comprising:

a) carrying out a plurality of cutting procedures for producing a cutting gap along a respective portion of a plurality of portions of a cutting line that extends at least partially along a contour of the workpiece part to be produced from the workpiece, wherein each of the plurality of cutting procedures comprises:

moving a beam head for guiding the processing beam above the workpiece, wherein the processing beam is guided along the cutting line, and wherein the processing beam has a first power density configured such that the workpiece is cut through, b) carrying out at least one finishing procedure for finishing the workpiece along at least one finishing line corresponding to at least one part of the cutting gap, during which the workpiece part is not completely cut out, a finishing procedure of the at least one finishing procedure comprising:

moving the beam head over the workpiece, wherein the processing beam is guided along a finishing line, wherein the processing beam has a second power density smaller than the first power density and configured such that the workpiece is not cut through, and wherein the workpiece is irradiated by the processing beam, along the finishing line corresponding to a part of the cutting gap, in at least one of a region containing a first cutting edge on the workpiece part to be produced or a region containing a second cutting edge on the residual grid to be produced, the first cutting edge and the second cutting edge defining the part of the cutting gap, wherein the plurality of cutting procedures comprises a first cutting procedure for creating a first part of the cutting gap from a first cutting position to a second cutting position and a second cutting procedure for creating a second part of the cutting gap from the second cutting position to a third cutting position, the second cutting procedure being immediately after the first cutting procedure among the plurality of cutting procedures, and a first finishing procedure is performed after the first cutting procedure and before the second cutting procedure and along a first finishing line from a first finishing position to a second finishing position, the first finishing line corresponding to the created first part of the cutting gap, and the second cutting procedure is performed after a completion of the first finishing procedure.

13. The beam processing device of claim 12, wherein the operations further comprise carrying out a plurality of finishing procedures along the at least one finishing line corresponding to the at least one part of the cutting gap.

14. The beam processing device of claim 12, wherein, in a last cutting procedure for generating the cutting gap, a last part of the cutting gap is generated, wherein the last part has a length smaller than a respective length of each of other parts of the cutting gap generated in all preceding cutting procedures, and wherein the respective lengths of the other parts of the cutting gap produced in the plurality of cutting procedures, starting from a free-cutting point of the workpiece part, do not decrease counter to a direction for producing the cutting gap.

15. The beam processing device of claim 12, wherein, in a last cutting procedure for generating the cutting gap, a last part of the cutting gap is generated to thereby cut free the workpiece part from the workpiece, and no finishing procedure is performed on the cut free workpiece part.

16. The beam processing device of claim 12, wherein one or more of the following finishing operations are carried out in the at least one finishing procedure:
   i) removing burr from at least one of the workpiece part-side cutting edge or the residual grid-side cutting edge of the cutting gap,
   ii) rounding at least one of the workpiece part-side cutting edge or the residual grid-side cutting edge of the cutting gap,
   iii) changing a shape of the cutting edge on at least one of the workpiece part-side cutting edge or the residual grid-side cutting edge of the cutting gap,
   iv) creating a chamfer along the cutting gap, and
   v) coating the workpiece along the cutting gap in a region containing at least one of the workpiece part-side cutting edge or the residual grid-side cutting edge of the cutting gap with a substance contained in a working gas beam.

17. A non-transitory machine readable storage medium coupled to at least one processor having machine-executable instructions stored thereon that, when executed by the at least one processor, cause the at least one processor to perform operations for controlling beam processing of a plate-shaped or tubular workpiece to produce a workpiece part from the workpiece, leaving a residual grid, the operations comprising:

a) carrying out a plurality of cutting procedures for producing a cutting gap along a cutting line that extends at least partially along a contour of a workpiece part to be produced from the workpiece, wherein each of the plurality of cutting procedures comprises:
   moving a beam head for guiding a processing beam above the workpiece, wherein the processing beam is guided along a respective portion of a plurality of portions of the cutting line, and wherein the processing beam has a first power density configured such that the workpiece is cut through,
b) carrying out at least one finishing procedure for finishing the workpiece along at least one finishing line corresponding to at least one part of the cutting gap, during which the workpiece part is not completely cut out, a finishing procedure of the at least one finishing procedure comprising:
   moving the beam head over the workpiece, wherein the processing beam is guided along a finishing line, wherein the processing beam has a second power density smaller than the first power density and configured such that the workpiece is not cut through, and wherein the workpiece is irradiated by the processing beam, along the finishing line corresponding to a part of the cutting gap, in at least one of a region containing a first cutting edge on the workpiece part to be produced or a region containing a second cutting edge on the residual grid to be produced, the first cutting edge and the second cutting edge defining the part of the cutting gap,
   wherein the plurality of cutting procedures comprises a first cutting procedure for creating a first part of the cutting gap from a first cutting position to a second cutting position and a second cutting procedure for creating a second part of the cutting gap from the second cutting position to a third cutting position, the second cutting procedure being immediately after the first cutting procedure among the plurality of cutting procedures, and a first finishing procedure is performed after the first cutting procedure and before the second cutting procedure and along a first finishing line from a first finishing position to a second finishing position, the first finishing line corresponding to the created first part of the cutting gap, and the second cutting procedure is performed after a completion of the first finishing procedure.

* * * * *